United States Patent

Uchiyama

[11] Patent Number: 6,007,387
[45] Date of Patent: Dec. 28, 1999

[54] CONNECTOR PRODUCING METHOD AND A CONNECTOR PRODUCED BY INSERT MOLDING

[75] Inventor: Takahiro Uchiyama, Yokkaichi, Japan

[73] Assignee: Sumitomo Wiring Systems, Ltd., Japan

[21] Appl. No.: 09/005,922

[22] Filed: Jan. 12, 1998

[30] Foreign Application Priority Data

Jan. 13, 1997 [JP] Japan .................................. 9-004113

[51] Int. Cl.[6] .............................................. H01R 13/405
[52] U.S. Cl. ............................................................ 439/736
[58] Field of Search .................................. 439/736, 695, 439/686, 606, 106

[56] References Cited

U.S. PATENT DOCUMENTS 4,579,404  4/1986  Lockard ................................... 439/736
4,826,443  5/1989  Lockard ................................... 439/606

FOREIGN PATENT DOCUMENTS 7-11771  2/1995  Japan .

Primary Examiner—Gary F. Paumen
Attorney, Agent, or Firm—Anthony J. Casella; Gerald E. Hespos

[57] ABSTRACT

A group of upper side male terminal fittings 2A and lower side male terminal fittings 2B are secured to the upper and lower surfaces of a mount plate 8 formed as a separate piece by pressing projections 12 into mount holes 16, thereby forming a core member 7. A housing 1 is formed by insert molding using this core member 7 as a core material. Since insert molding can be performed with the outer surfaces of the male terminal fittings 2A, 2B opposite from those secured to the mount plate 8 exposed, only the thickness of the housing 1 is added at the outer surfaces of the male terminal fittings 2A, 2B. Thus, there can be obtained a connector having a small thickness T around the male terminal fittings 2A, 2B.

13 Claims, 6 Drawing Sheets

CONNECTOR PRODUCING METHOD AND A CONNECTOR PRODUCED BY INSERT MOLDING

BACKGROUND OF THE INVENTION

1. Field of the Invention

The present invention relates to a connector producing method and to a connector produced by insert molding.

2. Description of the Prior Art

A prior art connector produced by insert molding is disclosed in Japanese Unexamined Utility Model Publication No. 7-11771 and is illustrated in FIG. 7 herein. As shown in FIG. 7, this connector is constructed such that a group of terminal fittings a, b are assembled into a housing c by insert molding, and male connector portions d, e are provided at the opposite ends. This connector is used as an intermediate connector or the like.

In producing such a connector by insert molding, the housing c may be molded according to the following method. A group of terminal fittings a, b are accommodated in a cavity of a mold and the ends thereof are inserted into mount grooves formed in the wall surface of the cavity. The housing c then is molded by injecting the cavity with synthetic resin. However, if the above method is adopted, particularly when the terminal fittings a, b have a long length, the terminal fittings a, b are elastically deformed upon being subjected to an injection pressure of the resin, with the result that the lengths of the terminal fittings a, b projecting in the male connector portions d, e may vary and, in an extreme case, the terminal fittings a, b may be brought into contact with each other.

As a countermeasure, the respective terminal fittings a, b are formed with intermediate members f, g for preventing a deformation by insert molding as shown in FIG. 8. The housing c is produced by insert molding using an assembly of the intermediate members f, g and the terminal fittings a, b as a core material. This prevents the terminal fittings a, b from being elastically deformed during the insert molding of the housing c.

On the other hand, the connector is required to have a smaller thickness for a space-saving purpose. However, if the connector is produced according to the prior art method, there is a limit in suppressing the thickness of the connector as a whole since there is the thickness of the intermediate members f, g surrounding the respective terminal fittings a, b in addition to that of the housing c.

The present invention was developed in view of the above problems, and an object thereof is to enable the production of a connector having a smaller thickness.

SUMMARY OF THE INVENTION

According to the invention there is provided a method for producing a connector by assembling a plurality of terminal fittings into a housing preferably of a synthetic resin by insert molding. The method comprises the steps of forming a core member by securing the terminal fittings on surfaces of a nonconductive mount plate, and performing insert molding using the core member as a core material.

Accordingly, insert molding can be performed with the outer surfaces of the male terminal fittings preferably opposite from those secured to the mount plate exposed. Accordingly, only the thickness of the housing is added at the outer surfaces of the male terminal fittings, with the result that the thickness of the connector as a whole can be reduced or suppressed. Furthermore the displacement of the terminal fittings during the insert molding of the housing can be securely prevented.

According to a preferred embodiment of the invention, there is provided a method for producing a connector by assembling a plurality of terminal fittings which are not in contact with each other into a housing of a synthetic resin by insert molding. As part of the method, a core member is formed by securing the terminal fittings on the opposite surfaces of a nonconductive mount plate, and insert molding is performed using the core member as a core material.

Preferably, the securing step of the terminal fittings comprises engaging mount holes preferably formed in the terminal fittings, with projections preferably formed on the mount plate. In other words, the terminal fittings are secured by engaging mount holes formed in the terminal fittings with projections formed on the mount plate. Accordingly, the terminal fittings are secured to the mount plate by the engagement of the projections and the mount holes.

Further preferably, the terminal fittings are secured to the mount plate while being connected with each other via a carrier and separated or cut from each other after being secured. Accordingly, the plurality of terminal fittings can be integrally or unitarily secured to the mount plate, enabling an efficient securing operation.

Still further preferably, the method further comprises the step of orienting or mounting the terminal fittings on the mount plate by or in or on mount grooves provided thereon. Accordingly a correct positioning and/or orientation of the terminal fittings with respect to each other or with respect to the housing itself can be easily achieved.

Most preferably, the securing of the terminal fittings on the mount plate is performed by means of press fitting and/or ultrasonic welding and/or gluing and/or clamping. Accordingly the terminal fittings are securely fixed to the mount plate such that their position remains substantially unchanged during the subsequent step of insert molding to form the housing.

According to the invention, there is further provided a connector, preferably produced by a method according to the invention, comprising: a nonconductive mount plate, a plurality of terminal fittings secured to surfaces of the mount plate, and a housing formed by insert molding using the terminal fittings mounted on the mount plate as a core material.

According to a preferred embodiment of the invention, there is provided a connector produced by assembling a plurality of terminal fittings which are not in contact with each other into a housing of a synthetic resin by insert molding. The connector comprises a nonconductive mount plate, a plurality of terminal fittings secured to the opposite surfaces of the mount plate, and a housing formed by insert molding using the terminal fittings mounted on the mount plate as a core material.

Preferably, the connector further comprises mount holes, preferably formed in the terminal fittings, and projections preferably formed on the mount plate, being engageable with each other to secure the terminal fittings on the mount plate. Accordingly, the terminal fittings can be easily secured to the mount plate.

Further preferably, the mount plate is made out of the same material, in particular the same synthetic resin as the housing and preferably comprises mount grooves into which the terminal fittings are insertable. Accordingly, the terminal fittings can be easily oriented and held in a preferred orientation during the insert molding and/or curing of the housing.

Still further preferably, the terminal fittings are secured or fixed to the mount plate by press fit and/or and/or ultrasonic welding and/or gluing and/or clamping.

Most preferably, the mount plate comprises at least one opening preferably formed as a through hole, into which the material, preferably the synthetic resin of the housing is insertable or fillable upon forming the housing by insert molding. Accordingly the housing and the mount plate carrying the terminal fittings are even more intimately connected and fixed to each other.

Most preferably, at least two projections are provided for each terminal fitting.

According to the invention, there is further provided a use of a connector according to the invention, as or for a socket for an electric or electronic component or equipment such as a bulb, a fuse, a transistor, a resistor, an IC chip or the like, wherein at least one terminal fitting is provided for the connection with the electric or electronic component and wherein at least one further terminal is provided for an electric connection with an electric circuit.

These and other objects, features and advantages of the present invention will become more apparent upon a reading of the following detailed description and accompanying drawings.

DETAILED DESCRIPTION OF THE PREFERRED EMBODIMENTS

Hereafter, one embodiment of the invention is described with reference to FIGS. 1 to 6.

Figure 1:
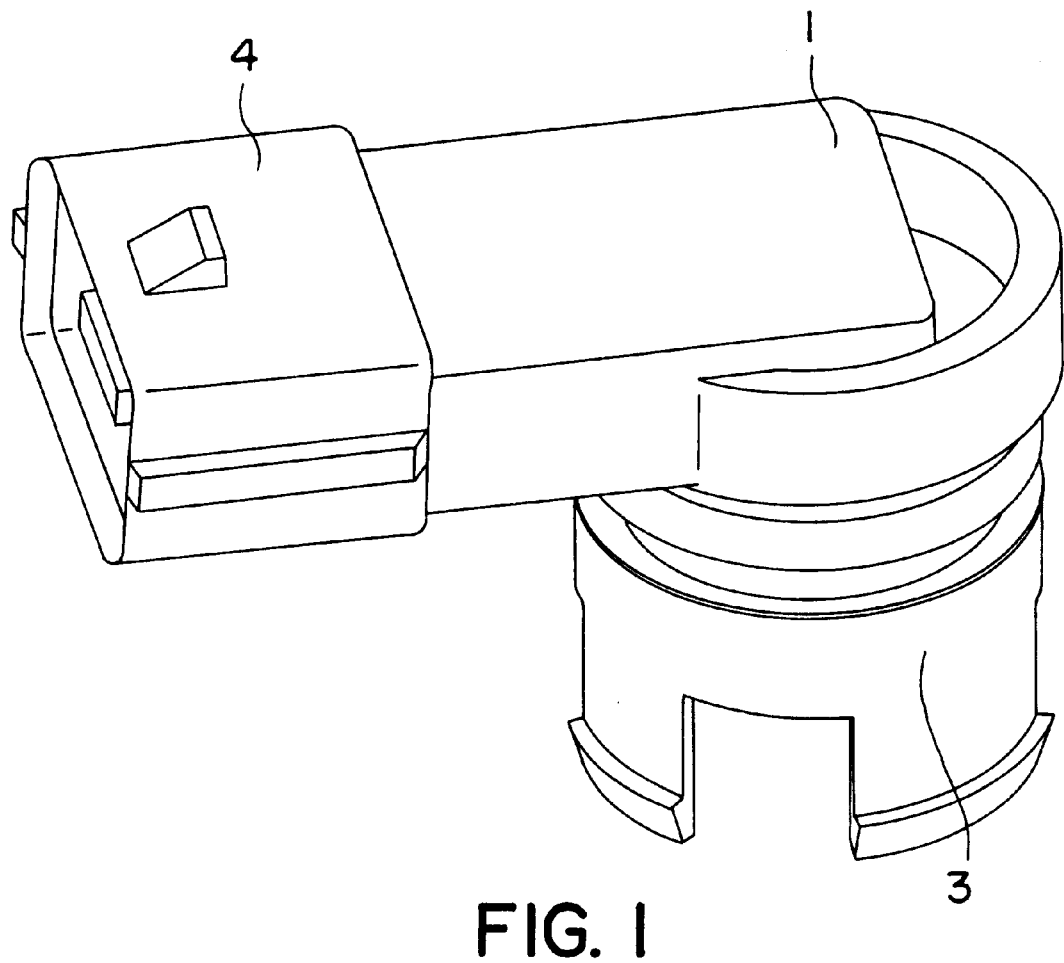
FIG. 1 is a perspective view showing the external construction of a connector according to one embodiment of the invention.
Figure 2:
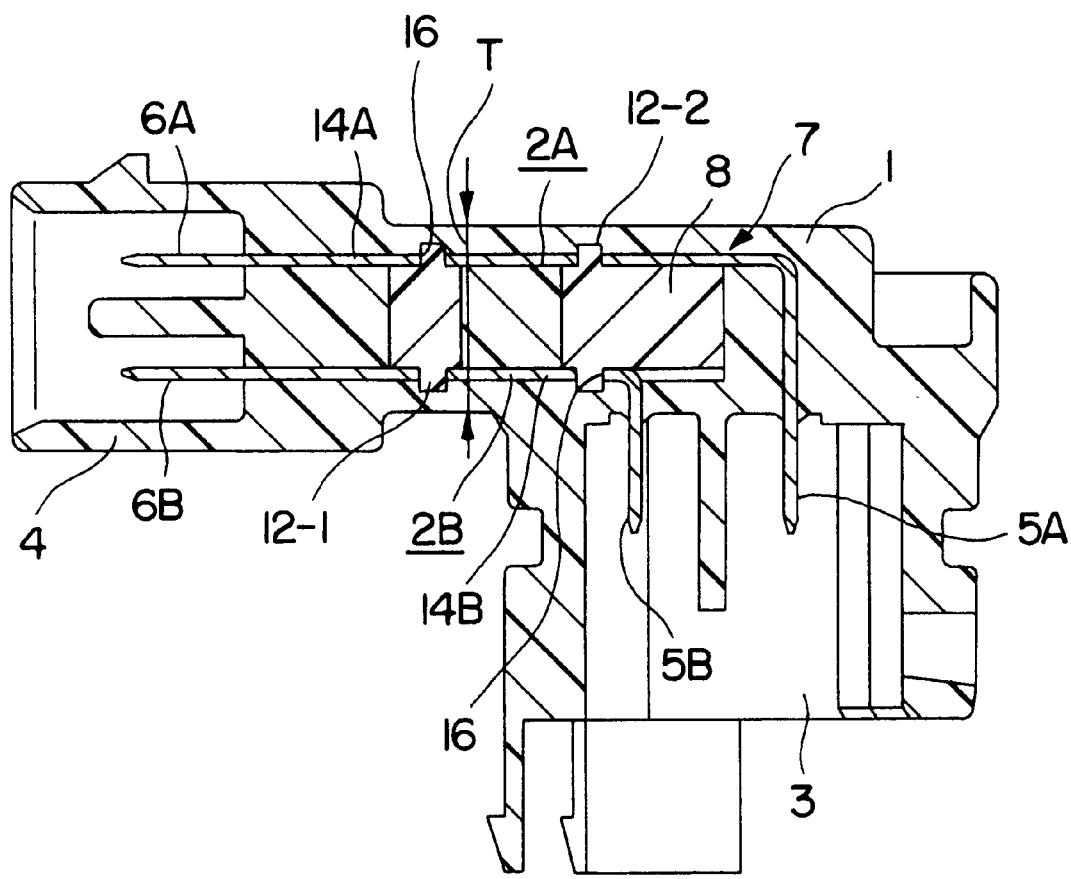
FIG. 2 is a section of the connector.
Figure 3:
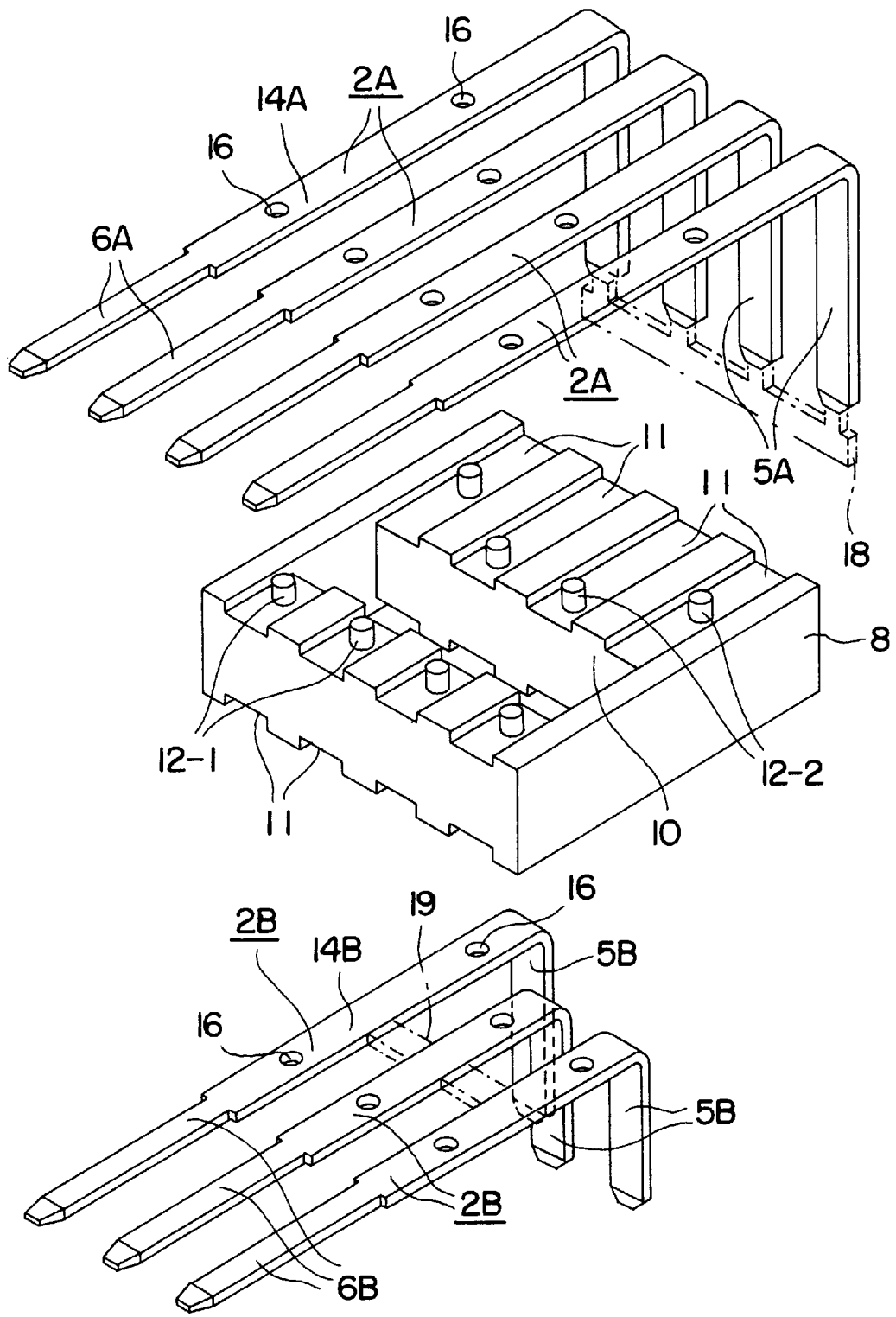
FIG. 3 is an exploded perspective view of a core member.

A connector according to this embodiment is an intermediate connector used by being mounted on, e.g. a fuel tank. As shown in FIGS. 1 and 2, a total of e.g. seven male terminal fittings 2A, 2B are assembled into a housing 1 which is preferably L-shaped as a whole. First and second male connector portions 3, 4 are formed at the opposite ends of the housing 1. The first male connector portion 3 has a substantially circular tubular shape, and tabs 5A, 5B at one side of the respective male terminal fittings 2A, 2B project substantially in alignment inside it so as to be engageable with unillustrated mating female connectors and fittable into an unillustrated mount hole opened in a lid e.g. of the fuel tank. The second male connector portion 4 has a substantially rectangular tubular shape, and tabs 6A, 6B at the other side of the respective male terminal fittings 2A, 2B similarly project in alignment inside it so as to be engageable with unillustrated other female connectors.

This connector is comprised of a core member 7 and the housing 1 formed by insert molding using the core member 7 as a core material. The core member 7 includes a mount plate 8 and a total of e.g. seven male terminal fittings 2A, 2B mounted on this mount plate 8.

The mount plate 8 is formed, as a separate piece, preferably of the same synthetic resin as the material of the housing 1 to be described later. This mount plate 8 has a specified thickness and a substantially square shape when viewed from front. An opening 10 is formed at one side of the mount plate 8. In each of first and second, in particular upper and lower surfaces of the mount plate 8, e.g. four mount grooves 11 in which the male terminal fittings 2A, 2B are fittable are formed substantially in parallel at specified intervals in such a manner as to cross at an angle different from 0° and 180°, preferably substantially normal the opening 10. Preferably two or more projections 12 project from the bottom surface of each mount groove 11. One group of projections 12-1 (left side projections in FIG. 3) are substantially aligned along a first edge, in particular the left edge of the opening 10. The other group of projections 12-2 are formed substantially along a second edge, in particular the right edge of the opening 10 in the two inner mount grooves 11 and in positions spaced apart from the second, in particular right edge of the opening 10 in the two outer mount grooves 11. Accordingly, the spacing between the two projections 12-1/12-2 in one mount groove 11 is longer in the two preferably outer mount grooves 11 than in the two preferably inner mount grooves 11. The positions of the projections 12 are preferably substantially the same in the upper and lower surfaces.

Preferably four male terminal fittings 2A and preferably three male terminal fittings 2B are secured to the upper and lower surfaces of the mount plate 8, respectively while being individually fitted in the mount grooves 11. Each of the upper side male terminal fittings 2A is shaped such that the tabs 5A, 6A are provided at the opposite ends of a substantially linear base portion 14A. In the base portion 14A, at least two mount holes 16 into which the projections 12 can be pressed or inserted or fitted are formed at the substantially same intervals as the projections 12 of the corresponding mount groove 11.

The tab 5A is formed e.g. by bending one end of the base portion 14A (right side of FIG. 3) downwardly at an angle different from 0° and 180°, preferably substantially right angles, and the tab 6A is formed e.g. by narrowing the other end of the base portion 14A. The e.g. four upper side male terminal fittings 2A are loaded while being integrally or unitarily assembled, for example, via a carrier 18 (see chain line of FIG. 3) extending over and interconnecting the tabs 5A preferably in a rigid or stiff manner.

The e.g. three lower side male terminal fittings 2B are fitted into the second to fourth lower mount grooves 11 from the front end of the mount plate 8. Each of the lower side male terminal fittings 2B is shaped similarly such that the tabs 5B, 6B are provided at the opposite ends of a linear base portion 14B. In the base portion 14B, at least two mount holes 16 into which the projections 12 can be pressed or inserted or fitted are formed at corresponding, preferably the substantially same intervals as the projections 12 of the corresponding mount groove 11.

The tab 5B is formed e.g. by bending one end of the base portion 14B (right side of FIG. 3) downwardly at an angle different from 0° or 180°, preferably substantially right angles, whereas the other tab 6B is formed by narrowing the other end of the base portion 14B. The three lower side male terminal fittings 2B preferably are loaded while being integrally or unitarily assembled, for example, via a carrier 19 (see chain line of FIG. 3) extending over and interconnecting the base portions 14B.

Next, a process for producing the connector according to this embodiment is described. First, the mount plate 8 formed as a separate piece is prepared. On the other hand, the four upper side male terminal fittings 2A integrally or unitarily connected via the carrier 18 and the three lower side male terminal fittings 2B integrally or unitarily connected via the carrier 19 are loaded. The at least one carrier 19 preferably is arranged in one or more positions corresponding to the opening 10 such that the carrier 19 may be cut or removed by a cutting device, e.g. a knife, which is or can be inserted through the opening 10 of the mount plate 8.

Figure 4:
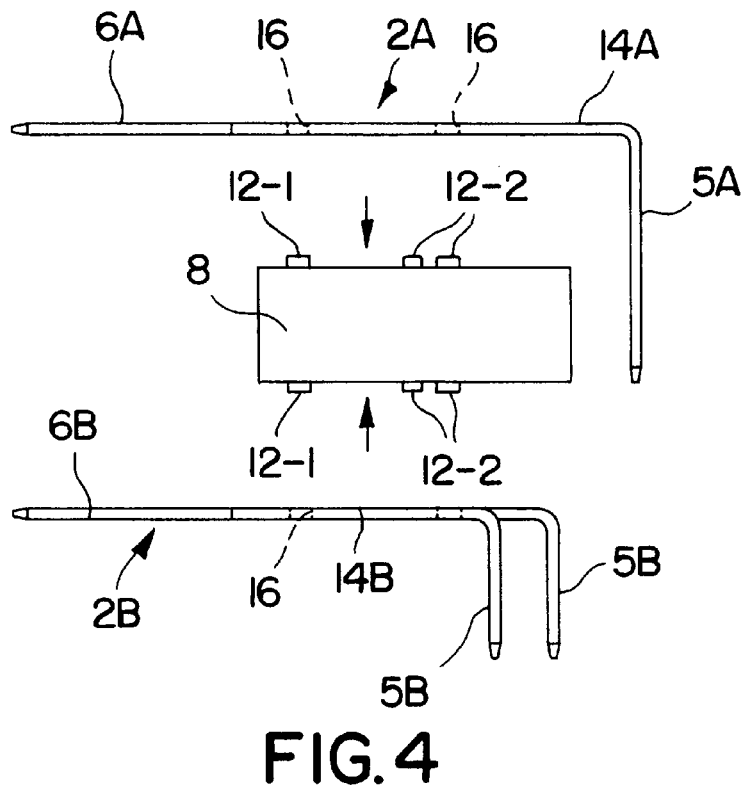
FIG. 4 is a front view showing how the core member is to be assembled.

Then, as indicated by an arrow of FIG. 4, the four upper side male terminal fittings 2A are pressed or inserted or fitted into the upper side mount grooves 11 while the respective mount holes 16 are positioned with respect to the corresponding projections 12, thereby pressing the projections 12 into the mount holes 16. As a result, the male terminal fittings 2A are secured to the upper surface of the mount plate 8 preferably by press fit or gluing or ultrasonic welding or clamping while being fitted into the mount grooves 11. The carrier 18 is cut at the same time or after this pressing operation, thereby separating the respective upper side male terminal fittings 2A from one another.

The three lower side male terminal fittings 2B also are pressed into the corresponding three mount grooves 11 on the lower surface of the mount plate 8 while the respective mount holes 16 are positioned with respect to the corresponding projections 12. The projections 12 similarly are pressed into the mount holes 16, with the result that the three male terminal fittings 2B are secured to the lower surface of the mount plate 8 preferably by press fit or gluing or ultrasonic welding or clamping while being fitted into the mount grooves 11. The carrier 19 is cut at the same time or after this pressing operation, thereby separating the respective upper side male terminal fittings 2B from one another. It should be noted that one mount groove 11 on the lower surface is or may be empty.

Figure 5:
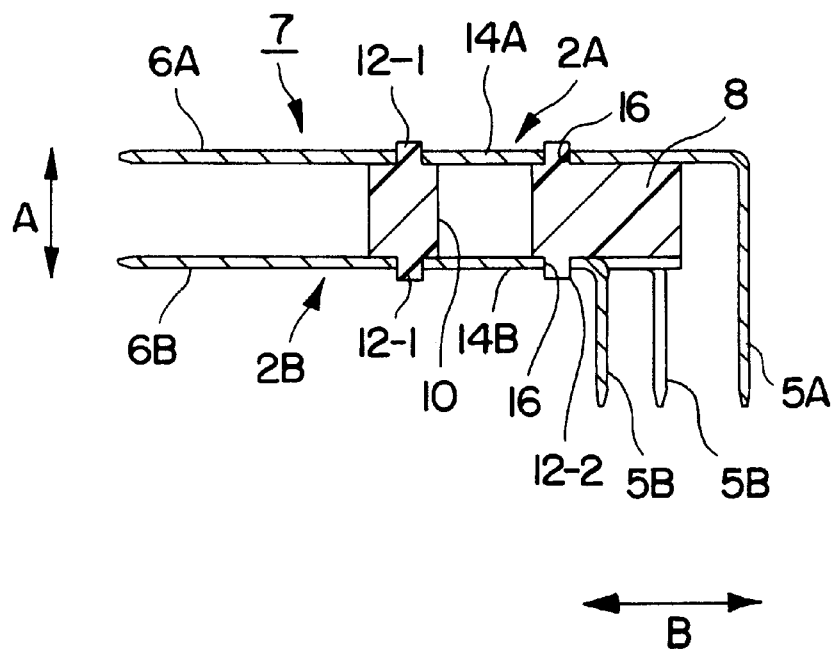
FIG. 5 is a section of the assembled core member.
Figure 6:
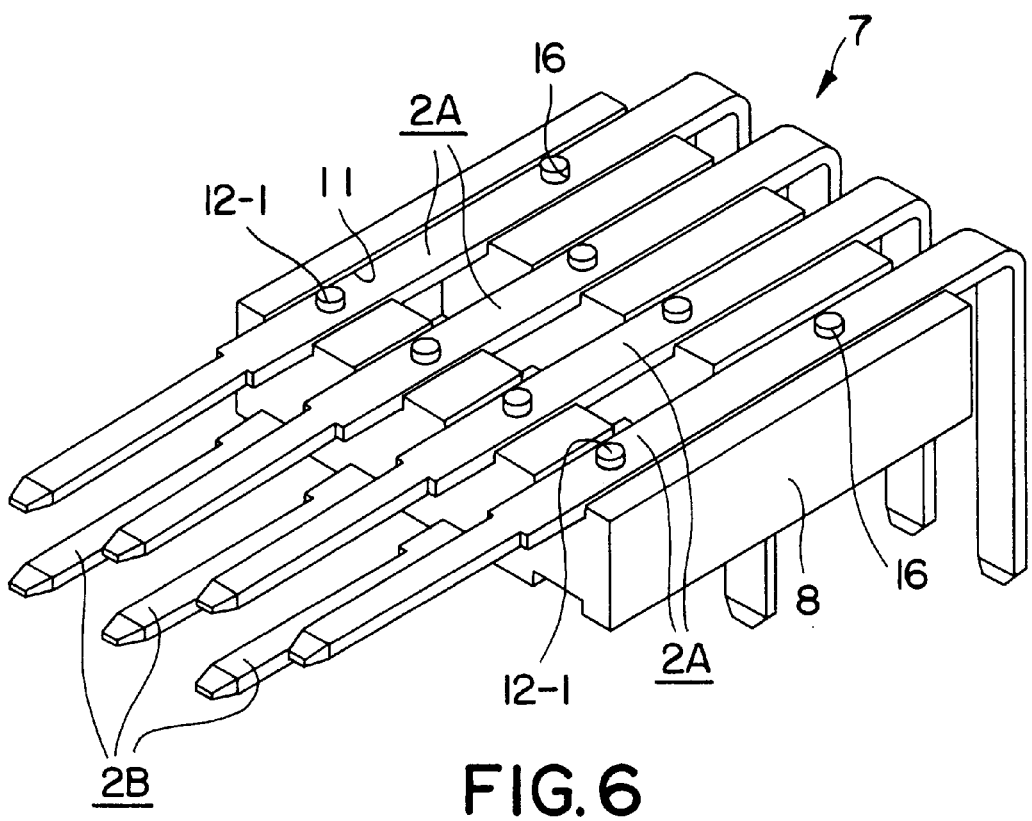
FIG. 6 is a perspective view of the assembled core member.
Figure 7:
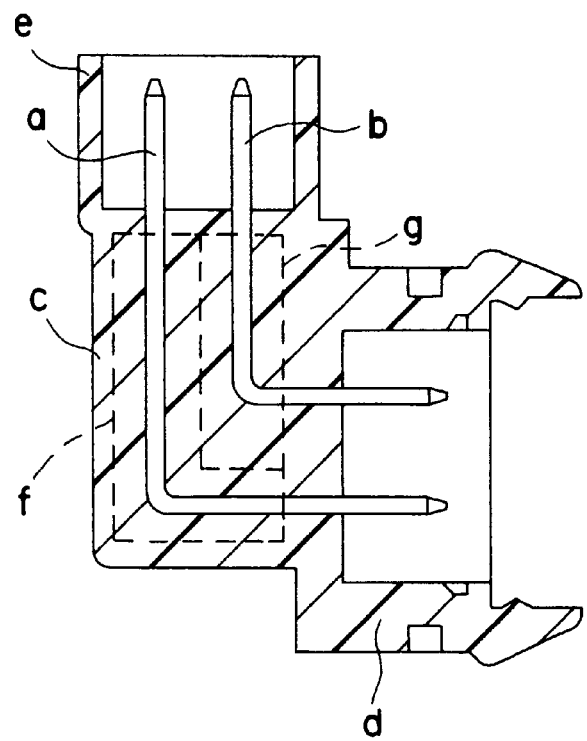
FIG. 7 is a section of a prior art connector.
Figure 8:
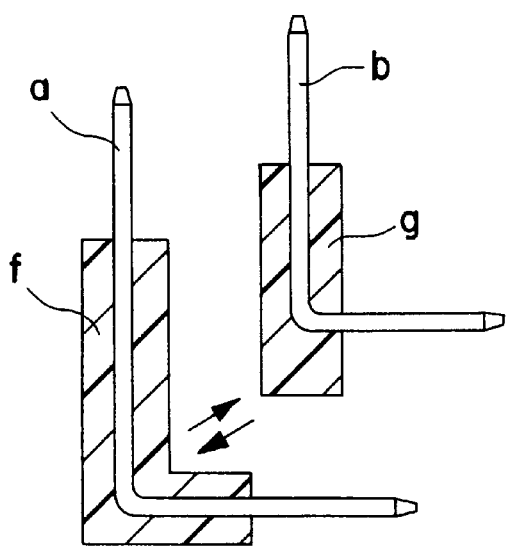
FIG. 8 is a section of a portion of the prior art connector corresponding to a core material thereof.

In this way, there is formed the core member 7 in which the four male terminal fittings 2A and the three male terminal fittings 2B are secured to the upper and lower surfaces of the mount plate 8 as shown in FIGS. 5 and 6. The corresponding tabs 6A, 6B of the upper and lower side male terminal fittings 2A, 2B substantially face each other while being spaced apart in a direction A (FIG. 5) at an angle different from 0° or 180°, preferably substantially normal to the longitudinal direction of the tabs 6A, 6B, e.g. in the vertical direction by a specified distance. Further, the corresponding tabs 5A, 5B face each other while being spaced apart by a specified distance along a direction B arranged at an angle different from 0° or 180°, preferably substantially normal with respect to the direction A, e.g. the transverse direction of FIG. 5. The tab 5B of one, preferably the farthest lower side male terminal fitting 2B from the front end of the mount plate 8 is positioned between the corresponding tabs 5A, 5B.

Subsequently, the thus assembled core member 7 is set in a cavity of a mold, and the housing 1, having substantially the same shape as the cavity is formed e.g. by insert molding around the core member 7 by filling the cavity with molten resin by injection. At this time, since the mount plate 8 is provided, the elastic deformation of the male terminal fittings 2A, 2B is prevented even if an injection pressure acts. After the resin is cooled, the above mentioned connector shown in FIGS. 1 and 2 is taken out by opening the mold.

According to this embodiment, the core member 7 which serves as a core material is formed by securing the male terminal fittings 2A, 2B to the upper and lower surfaces of the mount plate 8, and insert molding can be performed with the outer surfaces of the male terminal fittings 2A, 2B opposite from those secured to the mount plate 8 exposed. Accordingly, only the thickness of the housing 1 is added at the outer surfaces of the male terminal fittings 2A, 2B, and the connector is enabled to have a thickness T of FIG. 2 around the male terminal fittings 2A, 2B. Thus, an installation space for the connector can be made smaller.

Further, despite a plurality of upper and lower side male terminal fittings 2A, 2B, they can be rapidly and efficiently secured to the mount plate 8 since they are integrally or unitarily connected via the carrier 18 or 19.

The present invention is not limited to the described and illustrated embodiments. For example, the following embodiments are also embraced by the technical scope of the present invention as defined in the claims. Besides the following embodiments, a variety of changes can be made without departing from the spirit and scope of the present invention as defined in the claims.

The male terminal fittings may be secured by welding or gluing or clamping. Specifically, after the projections formed on the mount plate are fitted into the mount holes formed in the male terminal fittings, these projections are welded by ultrasonic waves so as not come out of the mount holes, thereby securing the male terminal fittings to the mount plate.

A desired number of terminal fittings may be arranged on the opposite surfaces of the mount plate.

The present invention is applicable not only to the intermediate connector illustrated in the foregoing embodiment, but also to connectors in general used for other purposes in which a group of terminal fittings are so arranged as to face each other within the housing.

A socket for a bulb, a fuse, a transistor, a resistor, an IC chip or the like electric or electronic component or equipment, in which a group of terminal fittings are assembled in a housing and a bulb receptacle and a connector portion are provided at one and the other ends, respectively can be conceived as a connector in a broader sense. Such bulb sockets are also embraced by the scope of the present invention as defined in the claims.

What is claimed is:

1. A connector comprising:
    a non-conductive mount plate having a plurality of outer surfaces, at least one of said outer surfaces having a plurality of substantially parallel terminal mount spaces defined on said surface, an elongate opening being formed through said non-conductive mount plate at an angle different from 0° and 180° to said parallel terminal mount spaces, such that said opening intersects each of said plurality of parallel terminal mount spaces;
    a plurality of terminal fittings secured to the respective terminal mount spaces on the at least one outer surface of the mount plate, such that each of said terminal fittings bridges the opening of the non-conductive mount plate; and
    a housing defining a unitary matrix of synthetic resin material in surrounding engagement with said non-conductive mount plate and said terminal fittings secured thereto, the unitary matrix of synthetic resin material extending into said opening and surrounding portions of said terminal fittings bridging said opening space.

2. A connector according to claim 1, further comprising mount holes formed in the terminal fittings, and projections formed on the surfaces of the mount plate, the projections being engaged in the mount holes for securing the terminal fittings to the mount plate.

3. A connector according to claim 2, wherein the mount plate is made out of the same material as the housing and comprises mount grooves into which the terminal fittings are secured.

4. A connector according to claim 2, wherein the terminal fittings are secured to the mount plate by an attachment selected from the group consisting of press fitting, ultrasonic welding and gluing.

5. A connector according to claim 2, wherein at least two projections are provided for each said terminal fitting.

6. The connector according to claim 5, wherein each said terminal mount space on said at least one surface comprises a groove formed in said surface, said grooves being substantially parallel to one another.

7. A connector according to claim 6, wherein one said projection for each said groove is disposed on a first side of said opening, and wherein another of said projections for each said groove is disposed on an opposed side of said opening.

8. A connector according to claim 7, wherein said at least one surface comprises first and second substantially parallel surfaces on opposite respective sides of said non-conductive mount plate, the opening extending entirely through said non-conductive mount plate from said first surface to said second surface.

9. A connector according to claim 2, wherein the opening is aligned substantially perpendicular to said parallel terminal mount spaces on said non-conductive mount plate.

10. A core member defining an insert for an insert molded electrical connector, said core member comprising:

a non-conductive mount plate having at least first and second oppositely facing surfaces and an opening extending through said non-conductive mount plate from said first surface to said second surface, a plurality of substantially parallel terminal mount spaces formed on at least said first surface such that each said terminal mount space includes a first portion on one side of said opening and a second portion on an opposed side of said opening; and a plurality of terminal fittings secured to the respective terminal mount spaces on said non-conductive mount plate such that each of said terminal fittings extends across said opening, whereby said core member can have a unitary matrix of synthetic resin material molded around said core member and extending through said opening to define a housing for said connector.

11. A core member according to claim 10, wherein each said terminal mounting space defines a groove having a first portion on one side of said opening and a second portion on an opposed side of said opening.

12. A core member according to claim 10, wherein each of said terminal mount spaces on said non-conductive mount plate comprises a first projection on one side of said opening and a second projection on an opposed side of said opening, said projections being spaced from said opening, each of said terminal fittings having a pair of mount holes formed therethrough, said mount holes being dimensioned and disposed for secure mounting over said projections of the respective terminal mount space.

13. A core member according to claim 12, wherein said terminal mount spaces are formed on each of said opposed first and second surfaces of said non-conductive mount plate.

* * * * *